US006488841B2

(12) United States Patent
Glasgow

(10) Patent No.: US 6,488,841 B2
(45) Date of Patent: Dec. 3, 2002

(54) ADJUSTABLE SKIMMER WITH PIVOT ARMS

(76) Inventor: James A. Glasgow, 7481 Timberlane Dr., Cincinnati, OH (US) 45243

( * ) Notice: Subject to any disclaimer, the term of this patent is extended or adjusted under 35 U.S.C. 154(b) by 0 days.

(21) Appl. No.: 09/845,902

(22) Filed: Apr. 30, 2001

(65) Prior Publication Data

US 2002/0157996 A1 Oct. 31, 2002

(51) Int. Cl.$^7$ .................................................. C02F 1/40
(52) U.S. Cl. ...................... 210/122; 210/242.3; 210/540
(58) Field of Search ............................. 210/122, 242.1, 210/242.3, 540, 172

(56) References Cited

U.S. PATENT DOCUMENTS

| 1,032,458 | A | * | 7/1912 | White ........................ 210/540 |
| 2,330,508 | A | * | 9/1943 | McColl .................... 210/242.3 |
| 2,497,177 | A | * | 2/1950 | McClintock et al. .... 210/242.3 |
| 2,585,878 | A | | 2/1952 | Tryon |
| 2,608,300 | A | * | 8/1952 | Small ...................... 210/242.3 |
| 2,670,848 | A | * | 3/1954 | Van Houten ............. 210/242.3 |
| 3,303,932 | A | | 2/1967 | Hirs et al. |
| 3,358,838 | A | * | 12/1967 | Kosar ...................... 210/242.3 |
| 3,688,909 | A | | 9/1972 | Titus et al. |
| 3,849,308 | A | | 11/1974 | Westerman |
| 3,849,311 | A | | 11/1974 | Jakubek |
| 3,923,661 | A | | 12/1975 | Crisafulli |
| 3,951,810 | A | | 4/1976 | Crisafulli |
| 3,970,556 | A | | 7/1976 | Gore |
| 4,010,103 | A | * | 3/1977 | Morgan et al. .......... 210/242.3 |
| 4,024,063 | A | | 5/1977 | Mori |
| 4,132,645 | A | | 1/1979 | Bottomley et al. |
| 4,224,162 | A | | 9/1980 | Ayroldi |
| 4,301,008 | A | | 11/1981 | Baffert et al. |
| 4,746,424 | A | | 5/1988 | Drew |
| 4,867,872 | A | | 9/1989 | Russell et al. |
| 4,892,666 | A | | 1/1990 | Paulson |
| 5,059,312 | A | | 10/1991 | Galletti |
| 5,167,815 | A | | 12/1992 | Bachmann et al. |
| 5,451,330 | A | | 9/1995 | Garrett |
| 5,601,705 | A | | 2/1997 | Glasgow |
| 6,056,128 | A | | 5/2000 | Glasgow |
| 6,277,273 | B1 | * | 8/2001 | Gore et al. ................. 210/540 |
| 6,287,460 | B1 | * | 9/2001 | Van Schie .................. 210/540 |

FOREIGN PATENT DOCUMENTS

EP          0 415 121 A1       3/1991

OTHER PUBLICATIONS

Abanaki Corporation, Oil Skimmer division, *Oil Skimmers*.
CLC Lubricants, *Li'l Tramp Skimmer/Aerator*.
CLC Lubricants, *Skimerator —Skimmer/Aerator*.
Douglas Engineering, *Skim–Pak Pump Systems*.
Douglas Engineering Coolant Recycling Systems. *Slim–Pak Skimmers and Tramp Oil Separators*.

(List continued on next page.)

Primary Examiner—Christopher Upton
(74) Attorney, Agent, or Firm—Wood, Herron & Evans, L.L.P.

(57) ABSTRACT

A skimming apparatus which skims a two-component liquid from the surface of a liquid mixture in a tank includes a pump which pumps the skimmed liquid to a coalescer for separating and collecting a lower density liquid component from the mixture and returning the rest of the liquid to the tank. The skimming apparatus further includes a skimmer which is designed to float on the surface of the liquid mixture in the tank. Arms extend between the skimmer and a mounting assembly so that as the level of the liquid mixture in the tank changes the skimmer will continue to skim from the surface of the liquid mixture. A self-adjusting tube assembly extends between the skimmer and the mounting assembly.

33 Claims, 7 Drawing Sheets

OTHER PUBLICATIONS

E&K Sales, Inc., Carol Company, *Tramp Oil Disc Skimmer*.
Master Products, *Master Oil Skimmer*, Modern Machine Shop advertisement.
Rising Sump Skimmers,*Skimmers*, brochure with copy of two photographs,
Virginia Panel/Mori Seiki, *Conventional Oil Skimming Techniques, Picture from Virginia Panel/Mori Seiki*.
Wayne Products, Inc., *Skinni–Mini*, Drum Oil Skimmer.
Zebra Skimmers, *Big Dipper—Disk Oil Lifter*, Modern Machine Shop advertisement.
Zebra Skimmers, *Big Dipper Disk Oil Lifter, Cost Savings Calculations for the Big Dipper vs. Conventional Oil Skimming Tehniques*, product flier.

* cited by examiner

ADJUSTABLE SKIMMER WITH PIVOT ARMS

FIELD OF THE INVENTION

This invention relates generally to removing a nonsoluble oil from an aqueous solution used as a coolant in a machining environment. More particularly, this invention relates to a skimmer which removes a quantity of liquid mixture from the surface of the liquid mixture inside a tank containing the mixture and pumps the mixture to a coalescer which separates the tramp oil from the aqueous solution and returns the aqueous solution to the tank so that the useful life of the aqueous solution may be prolonged.

BACKGROUND OF THE INVENTION

In many machining operations, an aqueous coolant is sprayed or flowed at the location where a cutting tool engages the workpiece, for lubrication and cooling purposes. The coolant is then collected in a tank located below the machine and recycled for continuous use for as long as possible.

Aqueous coolants of this type are fairly expensive, so it is advantageous to maintain such aqueous coolants in usable condition for as long as possible. Typical machining operations also include lubricating oil for lubricating movable parts. Eventually, this oil drips or flows into the aqueous coolant tank, where it floats upon the surface of the aqueous coolant due to its lighter weight and lower density. This oil, referred to as "tramp oil," will eventually also contribute to bacterial growth within the aqueous coolant, resulting in a foul odor and reducing the useful life of the aqueous coolant.

Due to environmental concerns, the oil-contaminated aqueous coolant must be treated as hazardous waste, and therefore represents an environmental and economic concern. Thus, tramp oil represents a serious environmental and economic problem with respect to maintaining proper and cost effective aqueous coolant use during machining operations.

A number of skimming devices have been developed over the years to remove tramp oil from the surface of aqueous coolant in a coolant tank for a machine. Disk skimmers include a disk which extends into the aqueous coolant and into contact with the tramp oil. Rotation of the disk near the surface results in removal of some oil from the surface, whereupon it is scraped by a blade and removed. Belt type skimmers involve an endless belt which removes tramp oil from the surface of the aqueous coolant, whereupon it is also scraped therefrom for removal. Disk and belt skimmers of this type are relatively inefficient and have space limitations for proper mounting and operation.

Floating tube skimmers and weir-type skimmers adapt to liquid level fluctuations, and they generally include a pump for pumping the skimmed liquid to a separation device. Such skimmers have proved to be acceptable in relatively large bodies such as lakes, ponds, rivers or even oceans. However, their size typically prevents their use in machining applications. In machining operations, most coolant tanks are as shallow as five or six inches, or as deep as several feet. Also, some machining coolant tanks are located in relatively inaccessible places without much spare space located adjacent thereto.

In summary, in machining operations it is necessary to skim primarily tramp oil from the surface of the aqueous coolant in the tank (though the skimmed liquid will also include some coolant), to deliver the tramp oil coolant mixture to a separation unit, to separate the tramp oil from the aqueous coolant for collection, and to return the aqueous coolant to the tank for reuse.

Applicant's U.S. Pat. No. 5,601,705 discloses a two-part system including a skimmer located inside a tank containing a liquid mixture and a coalescer located outside the tank. The skimmer skims the liquid mixture from the surface of the liquid mixture inside the tank. The coalescer includes a pump which pumps the skimmed fluid through a hose from the skimmer to the coalescer. The coalescer separates tramp oil from the mixture and returns "cleaned" coolant to the tank. Although U.S. Pat. No. 5,601,705 discloses one configuration or design of coalescer, the coalescer may take numerous configurations such as the one disclosed in applicant's U.S. Pat. No. 6,056,128.

Although the skimmer disclosed in U.S. Pat. No. 5,601,705 functions effectively, it has numerous parts which must be assembled in a certain manner, which is very time-consuming. Therefore, some may consider it too expensive to manufacture and too difficult to maintain in the event one or more parts fails.

Therefore, It is an object of this invention to reduce the number of parts of an aqueous coolant skimmer, specifically the number of moving parts and to simplify the manufacture of such a skimmer.

It is another object of this invention to improve access to the parts of an aqueous coolant skimmer, to make it easier maintain, without sacrificing the primary functional features of applicant's prior devices.

It is another object of this invention to enable the purchaser of an aqueous coolant skimmer to repair the skimmer including replacing the pump without sending the skimmer back to the manufacturer for repair.

It is still another object of the invention to achieve the above-noted objects for a variety of differently sized and shaped tanks for collecting and holding aqueous coolant.

SUMMARY OF THE INVENTION

The present invention achieves the above-stated objects by utilizing a floatable skimmer which floatably adjusts to the level of the liquid mixture in the tank while at the same time skimming liquid from adjacent the surface, a bracket located at a fixed vertical level in the tank and operatively connected to a vacuum source, and an outlet tube which conveys skimmed liquid from the skimmer to the pump due to the application of vacuum from the vacuum source, the outlet tube adapted to accommodate relative vertical movement between the floatable skimmer and the bracket.

Another aspect of the invention further contemplates a pair of spaced arms or connectors, each being pivotably connected at both ends, to the bracket and to the skimmer. These connectors assure stable relative vertical movement between the floatable skimmer and the bracket as the liquid level in the tank fluctuates up and down. These connectors also maintain a desired distance between the skimmer and the bracket.

The invention also contemplates, as the vacuum source, the use of a submersible pump located along an outflow line or conduit. The pump preferably mounts to the bracket and the outflow conduit resides in fluid communication with one end of the outlet tube. Thus, the apparatus pumps skimmed liquid from the supply container, through the outlet tube, along the outflow conduit and eventually to a coalescer.

The skimmer includes an open-top supply container with a variably sized inlet which adjusts in response to level liquid within the supply container, the supply container further having an outlet adjacent a bottom thereof, which is in fluid communication with one end of the flexible outlet tube. An adjuster residing within the open-top supply container floatably adjusts the size of the inlet in response to the level of the liquid within the supply container, so that the variation of the flow rate of the pump produces a corresponding change in the size of the cross sectional area of the inlet to the supply container. More specifically, an increase in the flow rate of the pump causes the adjuster to correspondingly increase the size of the inlet, while a decrease in the flow rate of the pump causes a corresponding decrease in the size of the inlet.

Overall, compared to applicant's prior skimmer, the present invention significantly reduces the number of parts. This reduction in the number of components also simplifies the overall construction. Moreover, because of its inventive structure, the parts are simpler in construction, and the parts are more accessible for an operator, and thereby easier to maintain and/or replace.

If the pump is mounted directly to the bracket, the pump resides immediately adjacent the skimming apparatus and within the tank. This arrangement helps to further simplify the overall construction of the coalescer, which is typically mounted to a nearby wall. Nevertheless, while a preferred embodiment the present invention contemplates a submersible pump connected directly to the bracket located in the coolant tank, it is to be understood that the pump could be located anywhere along the fluid connection between the outlet tube and the coalescer, so long as sufficient fluid pressure is maintained in the fluid line connection therebetween.

In an alternative embodiment of the present invention, the skimming apparatus is not secured to a tank wall. Rather, the skimming apparatus is secured to a support float which rises and lowers with the level of fluid inside the tank. This embodiment is preferably used inside deep tanks but may be used in any size of tank.

These and other features of the invention will be more readily understood in view of the following detailed description and the drawings.

DETAILED DESCRIPTION OF THE INVENTION

Figure 1:
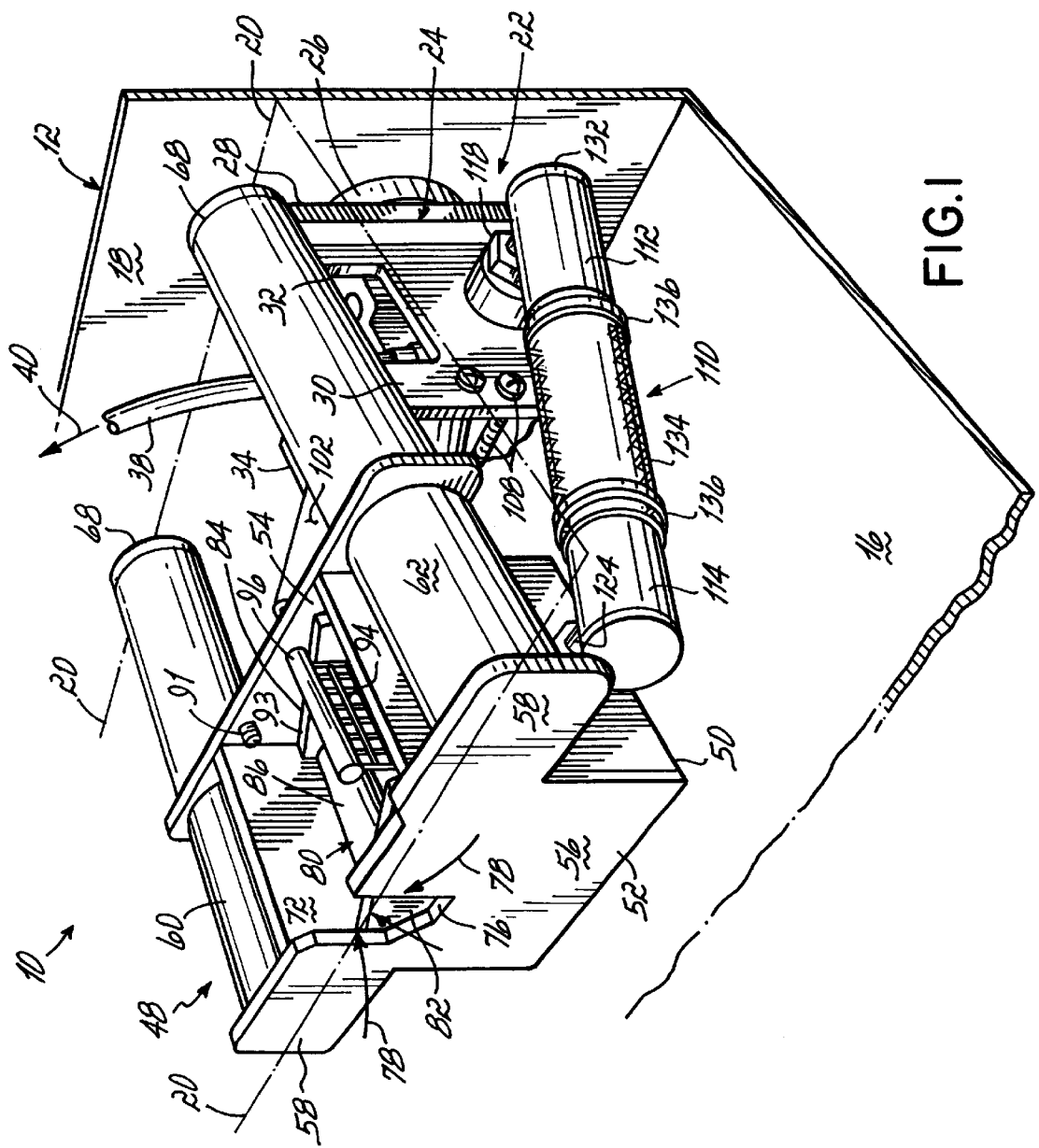
FIG. 1 is a perspective view of a preferred embodiment of the skimming apparatus of the present invention mounted inside a tank containing a liquid mixture.

The drawings, and particularly FIG. 1, illustrate a skimming apparatus 10 for skimming a liquid mixture of at least two liquid components from inside a tank 12 containing the mixture. The skimming apparatus 10 also pumps the skimmed fluid to an external location where the liquid components of the mixture are separated from one another and one of the components is returned to the tank 12.

The tank 12 has a bottom 16 and four side walls 18, only one of which is shown in FIG. 1. Although FIG. 1 illustrates a generally rectangular tank 12 containing the liquid mixture, the tank 12 may be other configurations such as circular or oval. One of the advantages of the present invention is that the skimming apparatus 10 may be quickly and easily mounted at different locations inside any number of different tanks.

The tank 12 is typically made of metal such as steel, but may be made of numerous other materials as well.

The liquid mixture is typically a water-based coolant into which some quantity of machine tool lubricating oil inevitably leaks. Reference numeral 20 identifies the liquid level inside the tank 12. In a machining environment, the liquid level 20 may vary in height ranging as low as 5 inches to as high as several feet. The liquid level 20 may be of any height depending upon the size of the tank and the volume of the liquid mixture.

The skimming apparatus 10 is secured to the tank 12 with a mounting assembly 22. (see FIG. 2) The mounting assembly 22 comprises a mounting bracket 24 and a magnet housing 26 inside which is located a magnet (not shown). Due to the metallic nature of the tank side wall 18, the mounting assembly may be secured to one of the side walls 18 of the tank 12 at any desired location and held at such a location due to the magnetic force of the magnet and the tank side wall 18.

Figure 4:
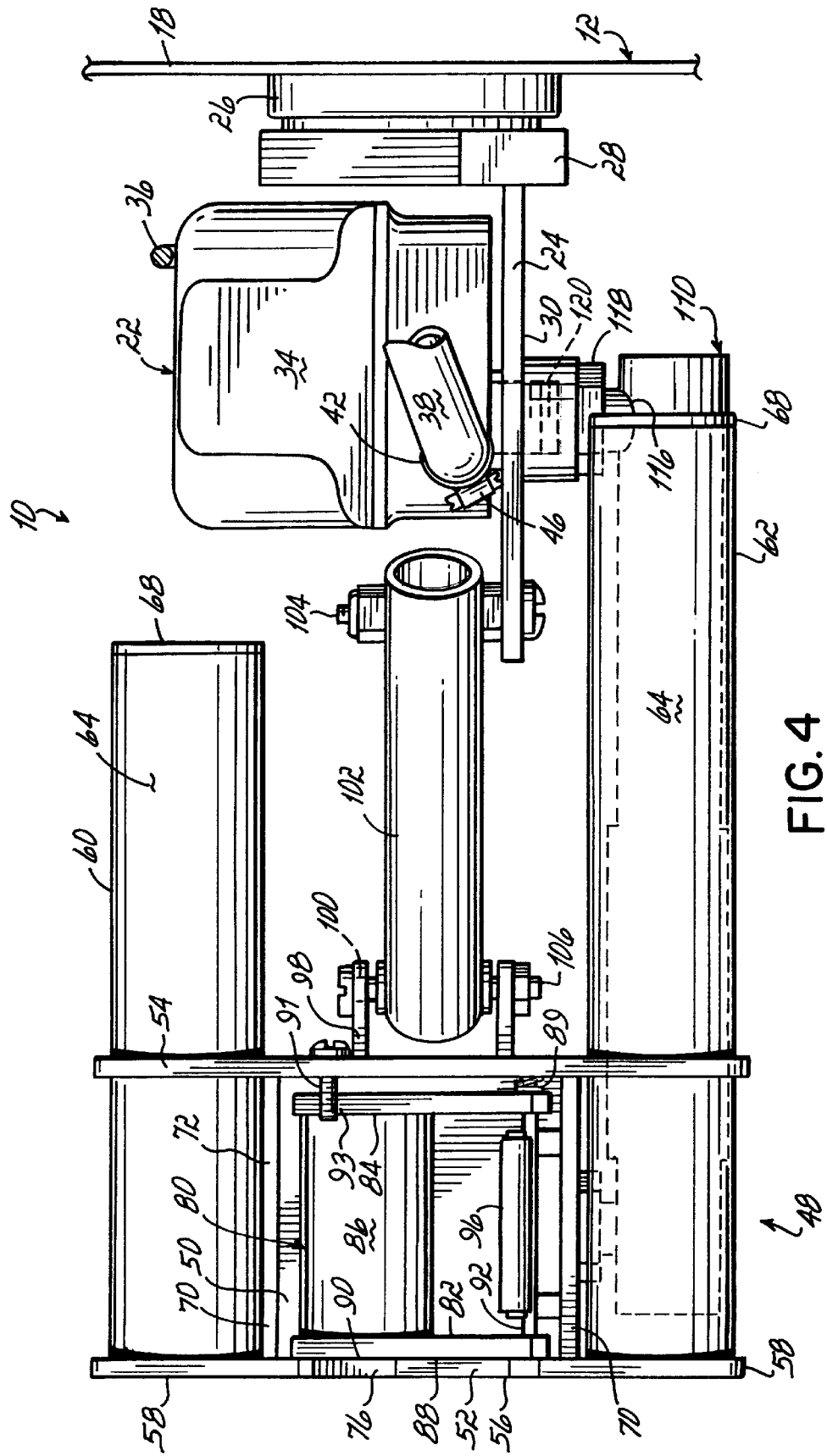
FIG. 4 a top plan view of the skimming apparatus of the present invention.

As illustrated in FIG. 4 in plan view, the mounting bracket 24 is a generally L-shaped cross section comprising a first portion 28 oriented parallel wall 18 and a second portion 30 extending inwardly from the first portion 28 at a right angle i.e. away from the illustrated wall. The first and second portions 28, 30 extend generally perpendicular to one another and form a generally L-shaped cross sectional configuration (See FIG. 4). The second portion 30 of the mounting bracket 24 has a generally rectangular cut-out portion 32 which functions as a handle for the entire skimming apparatus 10. (see FIG. 2) The handle enables a user to transport the skimming apparatus 10 from one location to another quickly and easily without disassembly.

The mounting bracket 24 is preferably made of plastic, and more particularly polyvinylchloride or PVC. The magnet housing 26 is preferably made of metal, but may be made of other materials, and is secured to the mounting bracket 24 with a screw or other fastener (not shown).

As best illustrated in FIG. 4, a pump 34 is secured to the second portion 30 of the mounting bracket 24 and located on one side thereof. Any standard pump will function in the present invention. However, one which has proven satisfactory is manufactured by the Little Giant Pump Company of Oklahoma City, Okla., and is designated Model No. 1EA-42. Such a pump is a submersible centrifugal style pump which is capable of pumping 170 gal./hr. An electric cord 36 (see FIG. 2) which may be plugged into a outlet energizes or activates the pump 34.

Figure 2:
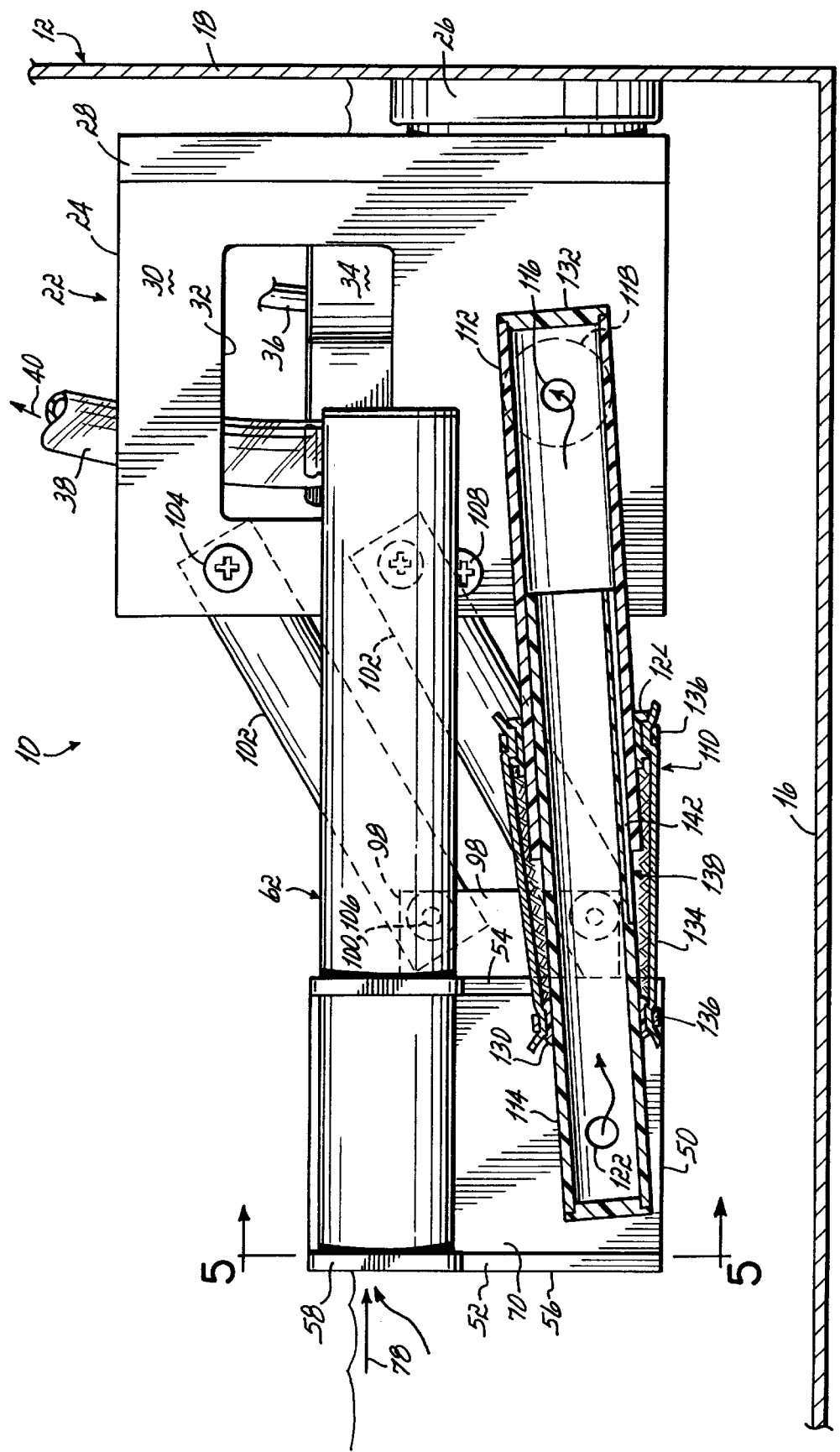
FIG. 2 is a side elevational view, partially cut away, of the skimming apparatus of FIG. 1.
Figure 3:
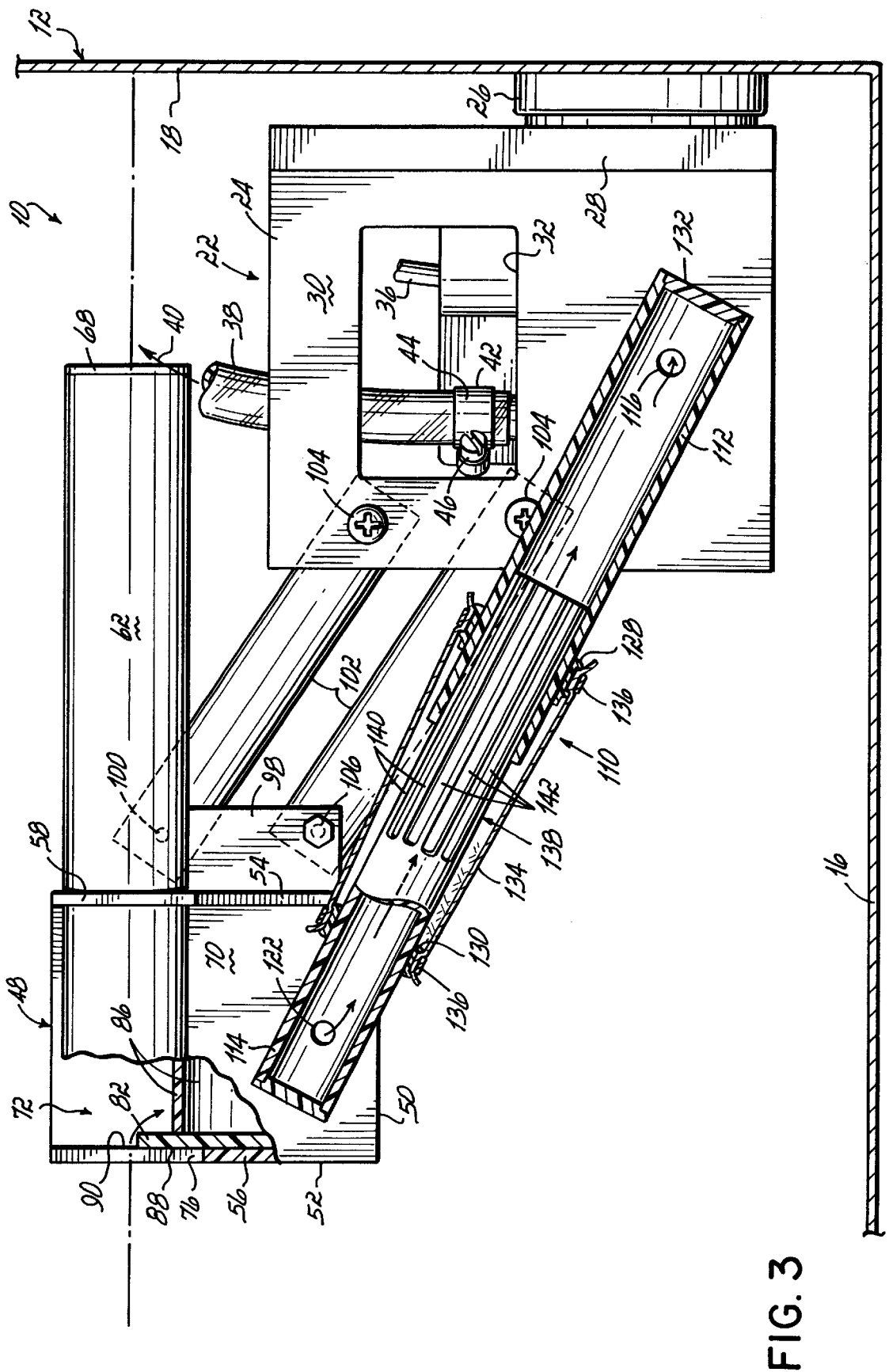
FIG. 3 is a side elevational view, partially cut away, of the skimming apparatus of FIG. 1 with the skimmer raised relative to its position illustrated in FIG. 2.

An outflow conduit 38 adapted to convey fluid extends upwardly and outwardly from the pump 34 as illustrated in FIGS. 1–3. This conduit or flexible tube 38 leads to a coalescer such as the one disclosed in applicant's U.S. Pat. No. 6,056,128 where one liquid component of the liquid mixture is separated from another liquid component of the mixture due to their different densities. The conduit 38 is preferably a hose but may be a tube or any other type of structure through which fluid can flow in the direction of arrow 40. As illustrated in FIGS. 3 and 4, a conventional hose clamp 42 comprising a collar 44 and a screw 46 secures the conduit 38 to the pump 34, but any one of a number of other suitable fastening structures may be used.

The skimming apparatus 10 includes a floating skimmer 48 which skims the liquid mixture from the surface of the liquid inside the tank. As best illustrated in FIGS. 1 and 4, the skimmer 48 comprises a horizontally oriented bottom 50, a vertically oriented first or front wall 52 and a vertically oriented second or rear wall 54 generally parallel the front wall and spaced apart therefrom. Each of the front and rear walls 52,54 has a central portion 56 and a pair of outwardly extending outer portions 58.

A pair of floats 60 and 62 extend between the outer portions 58 of the front and rear walls 52, 54. The floats 60, 62 are adapted to float on the upper surface of the liquid mixture and prevent the skimmer 48 from sinking to the bottom of the tank 12. The floats 60, 62 are secured to the front wall 52, extend rearwardly from the front wall 52 through the rear wall 54 of the skimmer and continue rearwardly therefrom. One of the floats 60 is of a length shorter than the other float 62 in order to properly balance the skimmer 48 on the surface of the liquid mixture and as to not interfere with the pump 34. The weight of the skimmer 48 is heavier on one side due to a tube assembly which will be described below, causing the assembly to roll to one side. The difference in the length of the floats offsets this weight differential.

Figure 5:
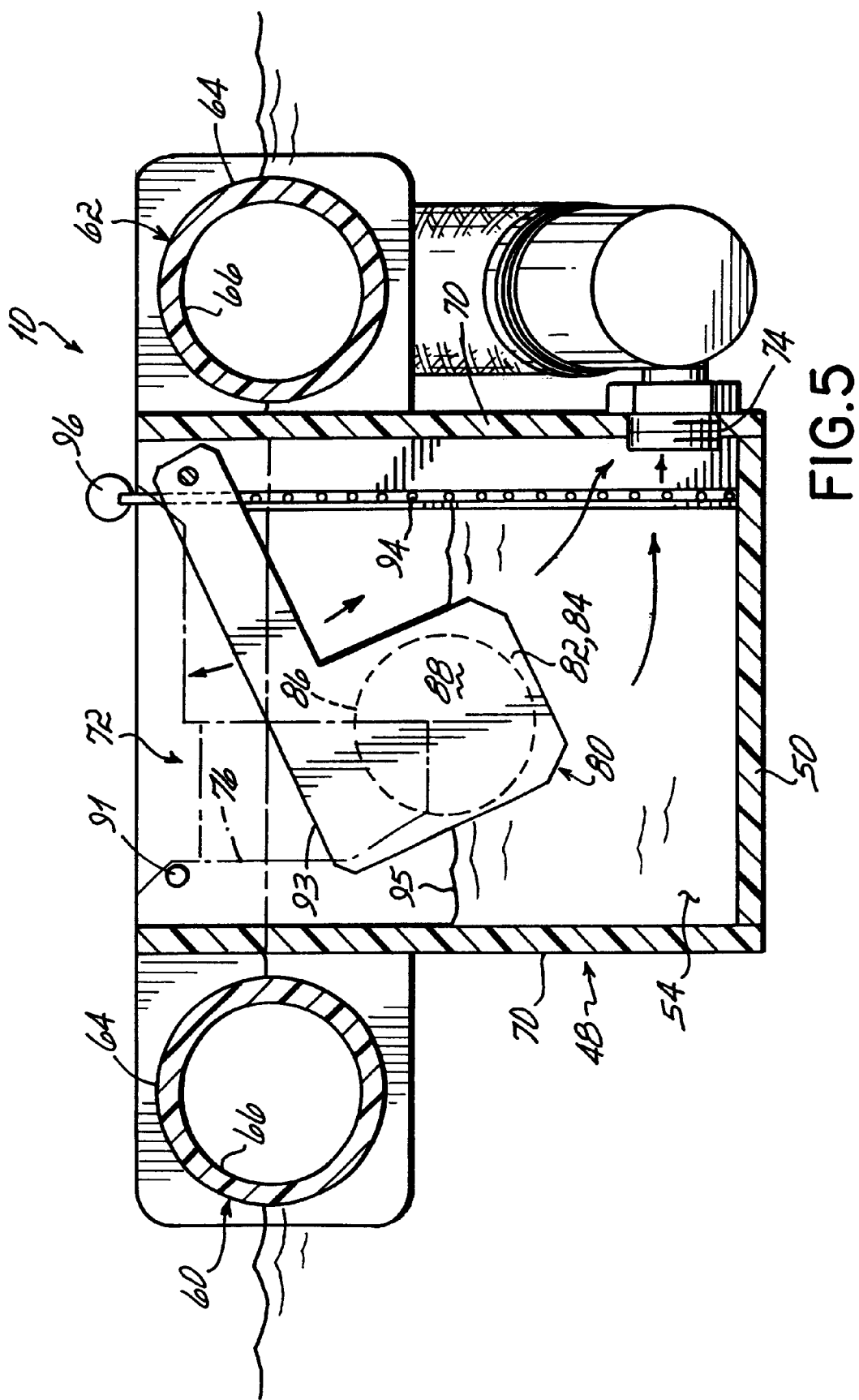
FIG. 5 is a view taken along the line 5—5 of FIG. 2.

As best illustrated in FIG. 5, each of the floats 60, 62 is a tube filled with air. Each of the floats 60, 62 has an outer surface 64 and an inner surface 66, the difference between the inner and outer surfaces comprising the thickness of the float wall. At the rearward end of each of the floats 60, 62, the tube is covered with a cap 68 in order to prevent liquid from getting inside the interior of the floats. As illustrated in FIG. 5, the upper surface of the liquid mixture is located approximately half way up the height of the floats 60, 62 or located at the midpoint of the floats 60, 62. The floats 60, 62 are preferably made of plastic, and more particularly polyvinylchloride or PVC, but may be made of other materials.

As best illustrated in FIGS. 1 and 5, the skimmer 48 further comprises a pair of spaced side walls 70 which extend between the front and rear walls 52, 54 above the bottom 50. Together, the bottom 50, front and rear walls 52, 54 and side walls 70 define an supply container 72 of the skimmer 48 which is adapted to receive and hold a quantity of the liquid mixture skimmed from the upper surface of the liquid mixture inside the tank. As illustrated in FIG. 5, one of the side walls 70 has a hole or outlet 74 therethrough. As illustrated in FIGS. 1 and 5, the front wall 56 of the skimmer 48 has an inlet 76 defined by a cutout through which the liquid mixture flows (see arrows 78) into the supply container 72.

As illustrated in FIGS. 1 and 5, an adjuster 80 located inside the supply container 72 regulates the flow of the liquid mixture through the inlet 76. As illustrated in FIG. 4, the adjuster 80 comprises a front bracket or wall 82 and a rear bracket or wall 84 between which extends a float 86 adapted to float on the surface of the liquid mixture inside the supply container. The float 86 is a tube filled with air but may be other structures of different shapes or sizes. The front bracket 82 has a front surface 88 which abuts against a rear surface 90 of the front wall 52 of the skimmer. As illustrated in FIG. 4, a biaser 89 pushes the adjuster forwardly toward the front wall 52 of the assembly. More specifically the biaser 89 extends between the rear bracket 84 of the adjuster 80 and the rear wall 54 of the skimmer 48. Although the biaser 89 is illustrated as being a spring, it may be any other biasing device.

As illustrated in FIG. 5, the adjuster 80 is pivotable about a horizontal axis defined by a rod 92 extending between the front and rear walls 52, 54 of the skimmer 48. As the float 86 moves up and down with the level 95 of skimmed liquid located inside the supply container 72, the adjuster 80 pivots about the horizontal axis. The interaction or contact of the front surface 88 of the front bracket 82 of the adjuster 80 and the rear surface 90 of the front wall 52 of the skimmer 48 removes debris therebetween by creating a wiping action and helps prevent the inlet 76 from becoming clogged.

As illustrated in FIGS. 1 and 4, a stop 91 extends into the supply container 72 and limits upward movement of the adjuster 80 by contacting an upper surface 93 of the rear bracket 84. Although the stop 91 is illustrated as being a screw, it may be other structures. Thus, the pivoting motion of the adjuster 80 inside the supply container 72 ensures proper operation of the skimming apparatus 10. When the pump 34 is shut down or turned off, fluid in tube 38 flows down the tube 38 which causes the supply container 72 to fill up with the back flow. As the supply container 72 fills with fluid, the adjuster 80 rises until it hits stop 91. The rising of the adjuster 80 closes the inlet 76 which keeps oil which was just skimmed from being pushed out of the supply container 72 through the inlet 76 into the tank 12. The front bracket or wall 82 of the adjuster 80 has a top edge 93 which is higher than the fluid in the tank 12 when the pump is off, creating a damming effect and completely shutting off the inlet 76.

As illustrated in FIGS. 1 and 5, a removable screen 94 having a top portion 96 extends downwardly into the interior of the supply container 72. This removable screen 94 functions to screen debris from the liquid mixture inside the supply container 72 before the liquid mixture passes through the hole 74 in one of the side walls 70 of the supply container. Although the removable screen 94 is preferably a wire screen, it may be made of plastic or any other type of material. The top portion 96 enables the removable screen 94 to be easily grasped by a user for removal.

As illustrated in FIG. 4, the mounting assembly 48 further comprises a pair of extensions 98 extending rearwardly from the rear wall 54 of the skimmer. Each of these extensions 98 is vertically oriented and has a pair of holes 100 therethrough (see FIGS. 2 and 3).

A pair of articulating pivot arms or connectors 102 extend between the mounting assembly 48 and the mounting bracket 24 of the mounting assembly 22. These pivot arms 102 are pivotably secured to the mounting bracket 24 with fasteners 104, which are illustrated as being screws but which may be any other type of fastener. The other end of the pivot arms 102 are secured to the extensions 98 of the mounting assembly 48 with fasteners 106 as illustrated in FIG. 4. These pivot arms 102 allow the skimmer 48 to move vertically inside the tank 12 with the level of the liquid mixture without affecting the operation of the pump or affecting the mounting assembly. Thus, the skimmer may move from a down position illustrated in FIG. 2 to an up position illustrated in FIG. 3. The downward movement of the skimmer 48 is limited by a limiter 108 which extends through the second portion 30 of the mounting bracket 24. The limiter 108 is illustrated in the drawings as being a screw but may be any other structure which limits downward movement of the pivot arms 102. This limiter 108 engages the lower pivot arm 102 and prevents the pivot arms from moving further downwardly beyond the down position illustrated in FIG. 2.

Figure 6:
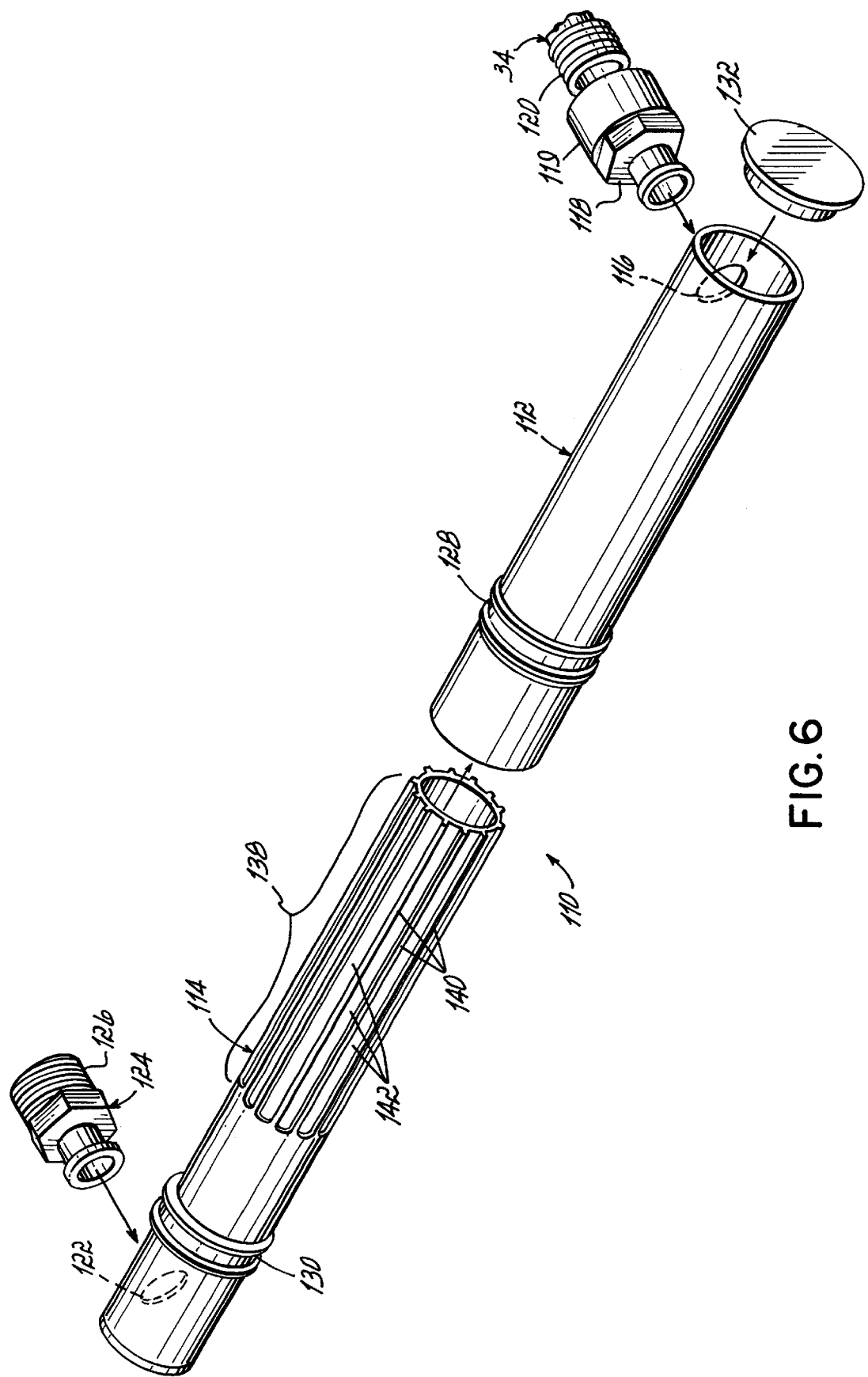
FIG. 6 is an exploded view of the tube assembly shown in FIGS. 1–5.

Another principal component of the skimming apparatus 10 of the present invention is a tube assembly or outlet tube 110. The tube assembly 110 extends between the skimmer 48 and the pump 34. The parts of the tube assembly 110 are illustrated in FIG. 6 and comprise a first tube 112 and second tube 114 adapted to slide inside the interior of the first tube 112. The first tube 112 has a hole 116 therethrough into which is inserted a coupling 118 having a female threaded end 119 adapted to engage a male threaded end 120 of the pump 34 and secure thereto. Similarly, the second tube 114 has a hole 122 therein which is adapted to receive a coupling 124 having a male threaded end 126 which is adapted to be threadably engage the hole 74 of one of the side walls 70 of the skimmer 48. As illustrated in FIG. 6, a collar 128 surrounds the first tube 112, and similarly a collar 130 surrounds the second tube 114. Caps 132 cover the ends of the first and second tubes 112,114 of the tube assembly.

The configuration of the tube assembly allows the tubes to move telescopically relative to one another as the skimming apparatus moves up and down with variations in the level of fluid inside the tank. The skimmed mixture which flows into the supply container 72 of the skimmer 48 and through the hole 74 in the side wall 70 flows into the tube assembly 110 via the coupling 124 through the tubes and is drawn through the coupling 118 by the operation of the pump. The second tube 114 slides inside the first tube 112 allowing the entire tube assembly to lengthen and shorten as necessary.

As illustrated in FIG. 1, a sleeve 134 extends between the tube pieces and prevents material and debris from entering the space between the tubes and inhibiting their movement relative to one another. The ends of the sleeve may be coated with a sealant to prevent the sleeve from fraying. The sleeve 134 may be made of fiberglass or nylon. Bands 136 illustrated in FIG. 1 secure the ends of the sleeve 134 inside the collars 128 and 130, thus securing the fiberglass sleeve 134 to the first and second tubes 112, 114.

The second tube 114 has a ribbed portion 138 which prevents debris and other materials from jamming the second tube inside the first tube and preventing movement of the tubes relative to one another. The ribbed portion 138 comprises ribs 140 between which are grooves 142. The ribbed portion 138 of the second tube 114 enhances the movement of the second tube 114 inside the first tube 112 and enhances the relative movement thereof.

Figure 7:
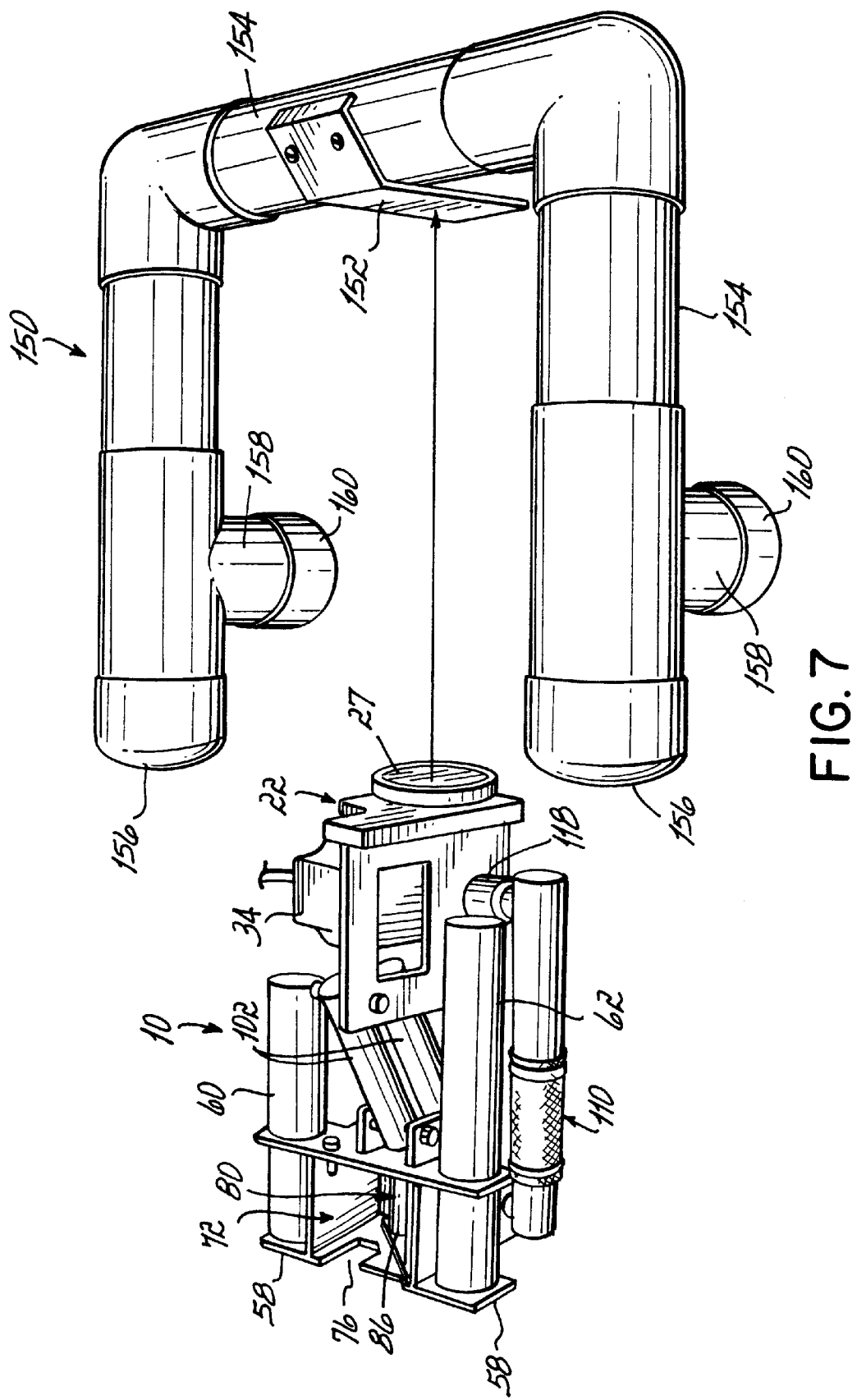
FIG. 7 a perspective view of the skimming apparatus of the present invention secured to a support float.

FIG. 7 illustrates an alternative embodiment of the present invention. In this embodiment a single support float 150 is used to support the skimming apparatus 10, the support float being adapted to rise and fall with the liquid level inside the tank. The support float 150 has a metal bracket 152 secured thereto. The magnet 27 of the mounting assembly 22 is secured to the metal bracket 152 in order to secure the skimming apparatus 10 to the support float. Other method or devices may be used to secure the skimming apparatus 10 to the support float 150.

As illustrated in FIG. 7, the support float 150 is preferably made of multiple pieces of plastic polyvinylchloride (PVC) pipe 154 secured together. End caps 156 cover the ends of the outermost pieces of pipe. A pair of support feet 158 covered at their lower ends with end caps 160 raise the support float 150 off the bottom of the tank 12 when the liquid level inside the tank drops below a certain level. Although a specific configuration of support float 150 is illustrated and described, those skilled in the art will appreciate that other configurations of a support float may be used. In addition, other materials may be used to construct the support float 150 and feet 158.

In operation, upon activation of the pump 34, the adjuster 80 inside the supply container 72 of the skimmer 48 is drawn downwardly due to the suction or vacuum drawn by the pump 34 on the fluid inside the supply container 72. This downward motion of the adjuster 80 increases the size of the inlet 76 integrally formed in the front wall 56 of the skimmer 48. Fluid flows through the inlet 76 into the supply container 72 and is pulled via the pump 34 through the hole 74 in the side wall 70 of the supply container 72 into the tube assembly 110, and up through the tube assembly 110 into the pump 34. The pump 34 then pumps the liquid mixture through an outlet tube 38 to a coalescer or other separator (not shown) located outside the tank 12 which removes "tramp" oil from the aqueous coolant. The cleaned aqueous coolant is then returned to the tank 12 for reuse.

The pump 34 is connected to a timer (not shown) which performs an on/off cycle often. Cycling helps the coalescer separate the oil in a more efficient manner. The cycling also helps create the wiper action described above.

While these and other features of the skimming apparatus in accordance with the preferred embodiment of the present invention have been described, it will be understood that the invention is not limited thereby and, in light of the present disclosure, various other alternative embodiments will be apparent to one of ordinary skill in the art without departing from the scope of the invention. For example, the invention may be used with different types of floats in order to float the skimmer of the present invention. Accordingly, applicant intends to be bound only by the following claims.

I claim:

1. A skimming apparatus for skimming a liquid mixture of at least two liquid components from a tank containing the mixture, comprising:

a mounting assembly for mounting said skimming apparatus inside a tank, arms pivotally secured to said mounting assembly, said arms extending between said mounting means and a skimmer, said skimmer being adapted to remove a quantity of said liquid mixture from said tank, a pump secured to said mounting assembly, said pump being adapted to transport said quantity of said liquid mixture to a location outside said tank.

2. The skimming apparatus of claim 1 wherein said skimmer has a pair of floats adapted to float on an upper surface of said liquid mixture.

3. The skimming apparatus of claim 2 wherein said skimmer has an supply container defined by a bottom of said skimmer, front and rear walls of said skimmer and a pair of side walls, one of said side walls having a hole therethrough.

4. The skimming apparatus of claim 3 further comprising a tube assembly extending between said pump and said supply container whereby upon activation of said pump said liquid mixture flows into said supply container, through said hole in said side wall of said supply container into said tube assembly, through said tube assembly into said pump whereby said pump pumps said liquid mixture through an outlet tube.

5. A skimming apparatus for skimming a liquid mixture of at least two liquid components from a tank containing the mixture, comprising:

mounting means for mounting said skimming apparatus inside said tank, a pump secured to said mounting means, means for activating said pump, pivot arms pivotally secured to said mounting means, said pivot arms extending between said mounting means and a skimmer, said skimmer being adapted to float on an upper surface of said liquid mixture and having an supply container defined by a bottom of said skimmer, front, rear and side walls of said skimmer, one of said side walls having a hole therethrough, a tube assembly extending between said pump and said supply container whereby upon activation of said pump said liquid mixture flows through an inlet in said front wall of said skimmer into said supply container, through said hole in said side wall of said supply container into said tube assembly, through said tube assembly into said pump whereby said pump pumps said liquid mixture through an outlet tube to a location outside said tank.

6. The skimming apparatus of claim 5 wherein said tube assembly comprises a first tube and a second tube adapted to slide inside said first tube.

7. The skimming apparatus of claim 6 wherein said tube assembly further comprises a fiberglass sleeve overlapping portions of said first and said tubes.

8. The skimming apparatus of claim 6 wherein said second tube of said tube assembly has a ribbed portion.

9. The skimming apparatus of claim 5 further comprising an adjuster located inside said supply container whereby said adjuster regulates the flow of said liquid mixture through said inlet.

10. The skimming apparatus of claim 9 wherein said adjuster comprises a float adapted to float on said liquid mixture inside said supply container.

11. The skimming apparatus of claim 9 wherein said adjuster is pivotally mounted on a rod extending between said front and rear walls of said skimmer inside said supply container.

12. The skimming apparatus of claim 5 further comprising a removable screen removably located inside said supply container for screening debris from said liquid mixture before said liquid mixture passes through said hole in said side wall of said supply container.

13. A skimming apparatus for skimming a liquid mixture of at least two liquid components from a tank containing the mixture, comprising:

a mounting assembly adapted to be secured to a tank wall, a pump secured to said mounting assembly, means for activating said pump, an outlet adapted to convey said liquid mixture from said pump to a location outside said tank, a pair of pivot arms pivotally secured to said mounting assembly, said pivot arms extending between said mounting assembly and a skimmer adapted to float on said liquid mixture inside said tank, whereby upon activation of said pump said liquid mixture flows into a cavity of said skimmer, through a tube assembly extending between said pump and said skimmer into said pump whereby said pump pumps said liquid mixture to a location outside said tank through an outlet tube.

14. The skimming apparatus of claim 13 wherein said tube assembly comprises multiple pieces.

15. The skimming apparatus of claim 13 wherein pivot arms enable said skimmer to move vertically inside said tank as the quantity of said liquid mixture inside said tank changes.

16. The skimming apparatus of claim 13 wherein said skimmer includes an adjuster adapted to float on top of said liquid mixture and regulate the quantity of said liquid mixture entering said cavity.

17. The skimming apparatus of claim 16 wherein said adjuster is pivotally mounted on a rod extending between spaced walls of said skimmer.

18. The skimming apparatus of claim 13 wherein said mounting assembly includes a mounting bracket and a magnet.

19. A skimming apparatus for skimming a liquid mixture of at least two liquid components from a tank containing the mixture, comprising:

a mounting assembly for mounting said skimming apparatus inside said tank, a pump secured to said mounting assembly, means for activating said pump, pivot arms extending between said mounting assembly and a skimmer, said skimmer being adapted to float on a top surface of said liquid mixture, said skimmer having an supply container located between a pair of floats, said supply container being generally below said top surface of said liquid mixture, a tube assembly extending between said pump and said supply container whereby upon activation of said pump said liquid mixture is pulled into said supply container through an inlet, from said supply container into said tube assembly, through said tube assembly into said pump whereby said pump pumps said liquid mixture through an outlet to a location outside said tank, whereby said quantity of said liquid mixture entering said supply container is regulated by an adjuster in said supply container.

20. The skimming apparatus of claim 19 wherein said adjuster is pivotally mounted on a rod extending between front and rear walls of said skimmer inside said supply container.

21. The skimming apparatus of claim 19 wherein said mounting assembly includes a magnet and a mounting bracket.

22. The skimming apparatus of claim 19 further comprising a removable screen removably located inside said supply container for screening debris from said liquid mixture before said liquid mixture passes from said supply container into said tube assembly.

23. A skimming apparatus for skimming a liquid mixture of at least two liquid components from a tank containing the mixture, comprising:

a bracket located in the tank at a desired vertical level;

a floatable skimmer having a pair of floats adapted to float on an upper surface of said liquid mixture, one of said floats being longer than the other float, said skimmer being operatively coupled to the bracket so as to move vertically relative to the bracket depending on the level of the liquid mixture in the tank, the skimmer including a supply container having an inlet which is located below the level of the liquid mixture in the tank when the skimmer is floating and during a skimming operation, thereby to gravitationally convey liquid into the supply container, the supply container also having an outlet adjacent a bottom thereof;

an outlet tube with a first end operatively secured to the outlet of the supply container and a second end held by the bracket, the outlet tube adapted to convey liquid outwardly from the bottom of the supply container, the outlet tube also adapted to accomodate different vertical positions of the skimmer relative to the bracket; and an adjuster located in the supply container and cooperatively interacting with the inlet to vary the size of the inlet depending on the depth of liquid in the supply container, thereby to maintain a liquid level in the supply container above the outlet.

24. The skimming apparatus of claim 23 further comprising:
   a pump operatively connected to the second end of the outlet tube and adapted to pump liquid from the supply container, whereby the adjuster adjusts the size of the inlet in response to changes in the flow rate of the pump.

25. The skimming apparatus of claim 23 and further comprising:
   at least one arm having a first end pivotally connected to the bracket and a second end pivotally connected to the skimmer.

26. A skimming apparatus for skimming a liquid mixture of at least two liquid components from a tank containing the mixture, comprising:
   a bracket located in the tank at a desired vertical level;
   a floatable skimmer operatively coupled to the bracket so as to move vertically relative to the bracket depending on the level of the liquid mixture in the tank, the skimmer including a supply container having an inlet which is located below the level of the liquid mixture in the tank when the skimmer is floating and during a skimming operation, thereby to gravitationally convey liquid into the supply container, the supply container also having an outlet adjacent a bottom thereof;
   an outlet tube with a first end operatively secured to the outlet of the supply container and a second end held by the bracket, the outlet tube adapted to convey liquid outwardly from the bottom of the supply container, the outlet tube also adapted to accommodate different vertical positions of the skimmer relative to the bracket; and
   an adjuster located in the supply container and cooperatively interacting with the inlet to vary the size of the inlet depending on the depth of liquid in the supply container, thereby to maintain a liquid level in the supply container above the outlet,
   a submersible pump mounted to the bracket and operatively connected to the second end of the outlet tube and adapted to pump liquid from the supply container, whereby the adjuster adjusts the size of the inlet in response to changes in the flow rate of the pump.

27. A skimming apparatus for skimming a liquid mixture of at least two liquid components from a tank containing the mixture, comprising:
   a bracket located in the tank at a desired vertical level;
   a floatable skimmer operatively coupled to the bracket so as to move vertically relative to the bracket depending on the level of the liquid mixture in the tank, the skimmer including a supply container having an inlet which is located below the level of the liquid mixture in the tank when the skimmer is floating and during a skimming operation, thereby to gravitationally convey liquid into the supply container, the supply container also having an outlet adjacent a bottom thereof;
   an outlet tube with a first end operatively secured to the outlet of the supply container and a second end held by the bracket, the outlet tube adapted to convey liquid outwardly from the bottom of the supply container, the outlet tube also adapted to accommodate different vertical positions of the skimmer relative to the bracket; and
   an adjuster located in the supply container and cooperatively interacting with the inlet to vary the size of the inlet depending on the depth of liquid in the supply container, thereby to maintain a liquid level in the supply container above the outlet, and
   a pair of spaced floats located on opposite sides of the supply container wherein one of floats is longer than the other.

28. A skimming apparatus for skimming a liquid mixture of at least two liquid components from a tank containing the mixture, comprising:
   a bracket located in the tank at a desired vertical level;
   a floatable skimmer operatively coupled to the bracket so as to move vertically relative to the bracket depending on the level of the liquid mixture in the tank, the skimmer including a supply container having an inlet which is located below the level of the liquid mixture in the tank when the skimmer is floating and during a skimming operation, thereby to gravitationally convey liquid into the supply container, the supply container also having an outlet adjacent a bottom thereof;
   an outlet tube with a first end operatively secured to the outlet of the supply container and a second end held by the bracket, the outlet tube adapted to convey liquid outwardly from the bottom of the supply container, the outlet tube also adapted to accommodate different vertical positions of the skimmer relative to the bracket; and
   an adjuster located in the supply container and cooperatively interacting with the inlet to vary the size of the inlet depending on the depth of liquid in the supply container, thereby to maintain a liquid level in the supply container above the outlet wherein the supply container has an open top, and
   a screen residing between the adjuster and the outlet, thereby to filter liquid being conveyed from the supply container outwardly through the outlet.

29. A skimming apparatus for skimming a liquid mixture of at least two liquid components from a tank containing the mixture, comprising:
   a bracket located in the tank at a desired vertical level;
   a floatable skimmer operatively coupled to the bracket so as to move vertically relative to the bracket depending on the level of the liquid mixture in the tank, the skimmer including a supply container having an inlet which is located below the level of the liquid mixture in the tank when the skimmer is floating and during a skimming operation, thereby to gravitationally convey liquid into the supply container, the supply container also having an outlet adjacent a bottom thereof;
   an outlet tube with a first end operatively secured to the outlet of the supply container and a second end held by the bracket, the outlet tube adapted to convey liquid outwardly from the bottom of the supply container, the outlet tube also adapted to accommodate different vertical positions of the skimmer relative to the bracket; and
   an adjuster located in the supply container and cooperatively interacting with the inlet to vary the size of the inlet depending on the depth of liquid in the supply container, thereby to maintain a liquid level in the supply container above the outlet wherein the inlet is defined by a cutout region formed in a first sidewall of the supply container, the adjuster including an internal float which floatably adjusts in response to the level of the liquid in the supply container, to increase or decrease a cross sectional flow area of the inlet which resides below the level of the liquid in the tank, in response to an increase or decrease, respectively, in the level of the liquid in the supply container, and a spring urging the adjuster against the first sidewall to assure a seal between the adjuster and the first sidewall around the cutout region.

30. A skimming apparatus for skimming a liquid mixture of at least two liquid components from a tank containing the mixture, comprising:

a bracket located in the tank at a desired vertical level;

a vacuum source operatively connected to the bracket;

a floatable skimmer residing in the tank and floatable on the surface of the liquid mixture, for skimming liquid from adjacent the surface of the liquid mixture at varying liquid levels in the tank;

a tube having a first end operatively connected to the skimmer and a second end secured to the bracket so as to be fluid communication with the vacuum source, the tube adapted to convey skimmed liquid from the skimmer to the vacuum source while accommodating different vertical positions of the skimmer relative to the bracket, due to varying levels of liquid in the tank; and at least one connector arm having a first end pivotally connected to the bracket and a second arm pivotally connected to the skimmer, to maintain a desired distance between the bracket and the skimmer at different liquid levels in the tank as skimming occurs.

31. The skimming apparatus of claim 30 wherein the vacuum source is a pump operatively connected to a conduit, the conduit having one end held by the bracket so as to be in fluid communication with the tube.

32. The skimming apparatus of claim 31 wherein the pump is submersible and mounted to the bracket.

33. A skimming apparatus for skimming a liquid mixture of at least two liquid components from a tank containing the mixture, comprising:

a float, a mounting assembly for mounting said skimming apparatus to said float, arms pivotally secured to said mounting assembly, said arms extending between said mounting means and a skimmer, said skimmer being adapted to remove a quantity of said liquid mixture from said tank, a pump secured to said mounting assembly, said pump being adapted to transport said quantity of said liquid mixture to a location outside said tank.

* * * * *

UNITED STATES PATENT AND TRADEMARK OFFICE
CERTIFICATE OF CORRECTION

PATENT NO. : 6,488,841 B2
DATED : December 3, 2002
INVENTOR(S) : James A. Glasgow It is certified that error appears in the above-identified patent and that said Letters Patent is hereby corrected as shown below:

Column 2,
Line 23, replace "It" with -- it --.

Column 3,
Line 26, replace "embodiment the" with -- embodiment of the --.
Line 54, replace "4 a" with -- 4 is a --.
Line 60, replace "7 a" with -- 7 is a --.

Column 4,
Line 59, replace "into a outlet" with -- into an outlet --.

Column 5,
Line 48, replace "define an" with -- define a --.

Column 7,
Lines 15-16, replace "to be threadably" with -- to threadably --.
Line 56, replace "method" with -- methods --.

Column 8,
Line 41, replace "mounting means" with -- mounting assembly --.
Line 51, replace "an supply" with -- a supply --.

Column 9,
Line 5, replace "an supply" with -- a supply --.
Line 22, replace "said tubes" with -- said second tubes --.

Column 10,
Line 19, replace "an supply" with -- a supply --.

Column 12,
Line 7, replace "of floats" with -- of said floats --.

UNITED STATES PATENT AND TRADEMARK OFFICE
CERTIFICATE OF CORRECTION

PATENT NO. : 6,488,841 B2
DATED : December 3, 2002
INVENTOR(S) : James A. Glasgow It is certified that error appears in the above-identified patent and that said Letters Patent is hereby corrected as shown below:

<u>Column 13,</u>
Line 21, replace "be fluid" with -- be in fluid --.

Signed and Sealed this

Twenty-fourth Day of June, 2003

JAMES E. ROGAN
*Director of the United States Patent and Trademark Office*